United States Patent
Weber et al.

(10) Patent No.: US 9,487,706 B2
(45) Date of Patent: Nov. 8, 2016

(54) COMPOSITION BASED ON MAGNESIUM SULFATE AND DIAMMONIUM HYDROGENPHOSPHATE

(71) Applicant: K+S Kali GmbH, Kassel (DE)

(72) Inventors: Ralf Weber, Kaufungen (DE); Ulrich Kleine-Kleffmann, Bad Hersfeld (DE)

(73) Assignee: K+S Kali GmbH, Kassel (DE)

( * ) Notice: Subject to any disclaimer, the term of this patent is extended or adjusted under 35 U.S.C. 154(b) by 96 days.

(21) Appl. No.: 14/397,344

(22) PCT Filed: Apr. 25, 2013

(86) PCT No.: PCT/EP2013/001247
§ 371 (c)(1),
(2) Date: Oct. 27, 2014

(87) PCT Pub. No.: WO2013/159930
PCT Pub. Date: Oct. 31, 2013

(65) Prior Publication Data
US 2015/0083980 A1     Mar. 26, 2015

(30) Foreign Application Priority Data

Apr. 27, 2012 (EP) .................................. 12166027

(51) Int. Cl.
*C09K 21/04* (2006.01)
*F16L 59/02* (2006.01)

(52) U.S. Cl.
CPC .............. *C09K 21/04* (2013.01); *F16L 59/028* (2013.01)

(58) Field of Classification Search
None
See application file for complete search history.

(56) References Cited

U.S. PATENT DOCUMENTS

| 4,552,803 | A * | 11/1985 | Pearson | C08G 12/40 106/164.3 |
| 4,996,065 | A * | 2/1991 | Van de Walle | A23K 20/26 426/454 |
| 5,217,616 | A * | 6/1993 | Sanyal | B01J 19/30 210/150 |
| 6,042,639 | A * | 3/2000 | Valso | C09K 21/10 106/18.15 |
| 7,216,652 | B1 * | 5/2007 | Fournier | A24D 1/02 131/349 |
| 2006/0185687 | A1 * | 8/2006 | Hearn | A24B 15/282 131/360 |
| 2013/0274347 | A1 * | 10/2013 | Pascal | C04B 30/02 514/770 |

FOREIGN PATENT DOCUMENTS

| DE | 196 48 855 A1 | 5/1998 |
| GB | 1171475 A | 11/1969 |
| WO | WO 96/00763 A1 | 1/1996 |

OTHER PUBLICATIONS

International Search Report issued Jul. 29, 2013 in PCT/EP2013/001247.
International Preliminary Report on Patentability and Written Opinion issued Oct. 28, 2014 in PCT/EP2013/001247.
B.E.I. Abdelrazig, et al., "The chemical composition of mortars made from magnesia-phosphate cement", Cement and Concrete Research, vol. 18, No. 3, XP55038955, (May 1, 1988), pp. 415-425.

* cited by examiner

*Primary Examiner* — Joseph D Anthony
(74) *Attorney, Agent, or Firm* — Oblon, McClelland, Maier & Neustadt, L.L.P.

(57) ABSTRACT

The present invention relates to compositions obtainable by reaction of a hydrate of magnesium sulfate with diammonium hydrogenphosphate and a further inorganic substance, especially anhydrous magnesium sulfate. The invention also relates to the production of the compositions and to the use thereof as flame retardants.

20 Claims, No Drawings

COMPOSITION BASED ON MAGNESIUM SULFATE AND DIAMMONIUM HYDROGENPHOSPHATE

DESCRIPTION

This invention concerns compositions which are available through the conversion of a hydrate of the magnesium sulfate with di-ammonium hydrogen phosphate and a further inorganic substance, in particular anhydrous magnesium sulfate. The invention also concerns the manufacture of the compositions and their utilization as flame-retardants.

For the thermal insulation of new and old constructions, insulation materials are employed which are manufactured in many cases of renewable or recycled organic fiber materials, such as excelsior, wood chipboard, sheep's wool or scrap-paper. Since such materials are often comparatively inflammable, flame-retardant is generally added to them during their processing to insulation materials. Certain salts and salt mixes are used as flame-retardants, which are usually mixed with the organic fiber materials in fine-ground form. In this connection, mixtures of borates with further salts, such as in particular magnesium sulfate ($MgSO_4 \cdot 7H_2O$) have proven themselves, where magnesium sulfate contributes to the flame retardation, particularly through its high hydrate content. Since recently the toxicological harmlessness of borates and boric acid is coming increasingly into question, a requirement exists for alternatives.

Basically it is known that ammonium phosphates, such as for example $(NH_4)_3PO_4$, $(NH_4)_2HPO_4$ and $(NH_4)H_2PO_4$, have fire-hampering effects. Own experiments of the inventors, however, have indicated that borates cannot simply be replaced by ammonium phosphates. Thus, with the grinding of mixtures of magnesium sulfate and ammonium phosphates, rubber-type masses arise instead of the required powder masses, which furthermore frequently bind with the grinding equipment. These mixtures accordingly have insufficient processing characteristics, which exclude their employment in any large-scale technical process.

In U.S. Pat. No. 4,374,171 as well as a series of further flame-suppressing salts, magnesium sulfate and ammonium hydrogen phosphate can also be listed. However, U.S. Pat. No. 4,374,171 does not manifest either mixtures of these salts or mixed salts available from them. In particular, U.S. Pat. No. 4,374,171 does not manifest any compositions which result from the conversion of a hydrate of the magnesium sulfate with di-ammonium hydrogen phosphate and anhydrous magnesium sulfate.

The invention has as its basis the task of providing a composition obtainable from magnesium sulfate which includes no borate, rather indicates fire-protection and processing properties which are comparable with those of mixtures of magnesium sulfate and borate.

Surprisingly, it was thought that, through the conversion of magnesium sulfate hydrates, such as magnesium sulfate, with di-ammonium hydrogen phosphate and anhydrous magnesium sulfate, compositions could be manufactured which would solve the task and, in particular, would have the required processing characteristics. The compositions thus obtained can therefore be especially well processed with insulation materials, partitularly into such substances which are based on organic fiber materials.

The subject of the invention are compositions which can be obtained through the conversion of at least one hydrate of the magnesium sulfate with di-ammonium hydrogen phosphate ($(NH_4)_2HPO_4$) and a further inorganic material or a further inorganic substance, where the further inorganic material or the further inorganic substance is selected under anhydrous magnesium sulfate, zeolite, anhydrous calcium chloride and their mixtures.

The invention-related compositions are solid, generally crystalline or at least mainly crystalline compositions. Unlike compositions, which are available through the conversion of hydrates of the magnesium sulfate with ammonium phosphate, ammonium hydrogen phosphate and ammonium di-hydrogen phosphate, they indicate useful processing characteristics and, in particular, can be processed without problems with insulation materials, based, on organic fiber materials, to insulating materials which are provided with good fire protection. Furthermore, the invention-related compounds are easily accessible through simple processes and can be manufactured in individual form, somewhat in powder form.

It is assumed that the property of the further inorganic material to bind water is the reason for the useful properties of the invention-related compositions.

The compositions of the existing invention available through the above-designated conversion generally include a compound of Formula I

$$[(NH_4)_2Mg(HPO_4)_2 \cdot mH_2O] \qquad (I),$$

or a mixture of the compound of Formula (I) with a compound of Formula II

$$[(NH_4)_2Mg(SO_4)_2] \cdot nH_2O \qquad (II),$$

where m is usually in the range 2 to 6, and preferably 3 to 5, as well as n is usually in the range 4 to 8, and preferably 5 to 7. In Formula I m means 4 in particular, and in Formula II n means 6 in particular.

In accordance with a further preferred implementation form, the invention-related compounds additionally include a hydrate of the magnesium sulfate, which includes per mol $MgSO_4$ 1 to 10, preferably 4 to 8, and in particular 6 equivalents $H_2O$.

Preferably the composition includes 30 to 100 wt. %, in particular 40 to 80 wt. %, a compound of Formula I or a mixture of compounds of Formulae I and II, as well as 0 to 70 wt. %, in particular 20 to 60 wt. %, of the hydrate of the magnesium sulfate, with reference to the total weight of the composition in each case.

A preferred implementation form of the invention concerns compositions which are obtainable as a further inorganic material through the conversion of at least one hydrate of the magnesium sulfate with di-ammonium hydrogen phosphate ($(NH_4)_2HPO_4$) and with anhydrous magnesium sulfate.

The invention-related compositions in each case preferably include less than 20 wt. %, in particular less than 15 wt. %, and especially less than 10 to wt. %, of compounds which are different from the compounds of Formulae I and II, as well as the magnesium sulfate hydrate, with reference to the total weight of the composition.

Provided that the compositions are obtainable through the conversion of at least one hydrate of the magnesium sulfate with di-ammonium hydrogen phosphate ($(NH_4)_2HPO_4$) and with a further inorganic material, which is selected among zeolites, anhydrous calcium chloride and their mixtures, the content of substances which are different from the compounds of Formulae I and II, as well as the magnesium sulfate hydrate, are also more than 20 wt. %, e.g. up to 50 wt. %, and then preferably in the range 5 to 50 wt. %, in particular in the range 10 to 30 wt. %, with reference to the total weight of the composition in each case. In case of substances which are different from the compounds of Formulae I and II, as well as the magnesium sulfate hydrate, it is a question in this case in particular of zeolites, anhydrous calcium chloride and hydrates of the calcium chloride, e.g. calcium chloride hexahydrate.

The identity and the content of compounds of Formulae I and II, of the magnesium sulfate hydrate and of most further compounds, which are possibly present in the invention-related compositions, can be determined by means of X-ray powder diffractometry through comparison of a powder diffractogram with corresponding reference-powder diffractograms. Such methods are known to the specialist sector and can be implemented in a known manner, for example with the aid of the powder X-ray diffractometry software: "EVA" Ver. 12.0.0.0 of the Co. Bruker AXS, database: Powder Diffraction Files (PDF-2, Release 1999; Data Sets 1-49, plus 70-86) of the International Center for Diffraction Data (ICDD).

From the absence of reflexes, which are characteristic for the yield compounds, in particular di-ammonium hydrogen phosphate and anhydrous magnesium sulfate or anhydrous calcium chloride, it can furthermore be concluded that their respective content is small in accordance with qualitative evaluation of the RDA diagram. The characteristic reflexes for $MgSO_4$ in the form of the anhydrate, magnesium sulfate and further possible starting materials and by-products, can be taken from the literature or relevant databases of the International Center for Diffraction Data (JCPDS).

The compound of Formula I included in the invention-related compositions, in an X-ray powder diffractogram recorded at 25° C. (Cu—$K_\alpha$ radiation: $\lambda$=1.5413 Å), generally indicates at least 3, and in particular at least 5, and especially at least 7 or all d-values of the following Table 1, where it indicates preferably at least 3, in particular at least 5, and especially at least 7, of the respective reflexes, whose relative intensity is at least 30%, with reference to the intensity of the strongest peak (100% rel. intensity). The measured intensities can deviate from the indicated values to a certain degree, since they depend on the sample preparation in a known manner. In Table 1 the characteristic reflexes of the Compound I are indicated as network designation separation distances d (in angstroms), which can be calculated with the Bragg relationship from 2Θ values.

TABLE 1

| d-value (Å) | Rel. intensity (%) |
|---|---|
| 5.1910 ± 0.0005 | 100 |
| 5.9150 ± 0.0005 | 79 |
| 4.3100 ± 0.0005 | 51 |
| 3.4624 ± 0.0005 | 35 |
| 5.9572 ± 0.0005 | 34 |
| 3.0122 ± 0.0005 | 33 |
| 3.9016 ± 0.0005 | 32 |
| 2.5845 ± 0.0005 | 28 |
| 3.3563 ± 0.0005 | 21 |
| 3.5925 ± 0.0005 | 21 |
| 2.5757 ± 0.0005 | 20 |
| 5.7450 ± 0.0005 | 19 |

Correspondingly, the compound of Formula II, possibly included in the invention-related compositions, indicate in a X-ray powder diffractogram recorded at 25° C. (Cu$K_\alpha$ radiation: $\lambda$=1.5413 Å) at least 3, and in particular at least 5, and especially at least 7, or all d-values of the following Table 2, where it indicates preferably at least 3, in particular at least 5, and especially at least 7, of the respective reflexes, whose relative intensity is at least 30%, with reference to the intensity of the strongest peak (100% rel. intensity). The measured intensities can deviate from the indicated values to a certain degree, since they depend on the sample preparation in a known manner. In Table 2 the characteristic reflexes of the compound II are indicated as network designation separation distances d (in angstroms), which can be calculated with the Bragg relationship from 2Θ values.

TABLE 2

| d-value (Å) | Rel. intensity (%) |
|---|---|
| 4.2054 ± 0.0005 | 100 |
| 3.8022 ± 0.0005 | 85 |
| 4.2633 ± 0.0005 | 58 |
| 5.3750 ± 0.0005 | 55 |
| 3.1510 ± 0.0005 | 54 |
| 3.0123 ± 0.0005 | 34 |
| 2.7834 ± 0.0005 | 34 |
| 4.1391 ± 0.0005 | 31 |
| 5.1510 ± 0.0005 | 30 |
| 4.3235 ± 0.0005 | 26 |
| 3.0529 ± 0.0005 | 23 |
| 2.4623 ± 0.0005 | 22 |

The further compounds possibly included in the invention-related, compositions can be identified in an X-ray powder diffractogram of an invention-related composition recorded at 25° C. (Cu—$K_\alpha$ radiation: $\lambda$=1.5413 Å) by means of the reflexes indicated in the following Table 3, where, for identification, typically at least 3 of the indicated d-values with a relative intensity of at least 30% are referred to. The measured intensities can deviate from the indicated values to a certain degree, since they depend on the sample preparation in a known manner. For zeolite, the corresponding reflexes can be taken from the following database: Database of Zeolite Structures: http://izasc.ethz.ch/fmi/xsl/IZA-SC/xrd.xsl

TABLE 3

| Contamination | d-value (Å) | Rel. intensity (%) |
|---|---|---|
| $(NH_4)_2SO_4$ | 4.3208 ± 0.0005 | 100 |
| | 4.3766 ± 0.0005 | 53 |
| | 3.0407 ± 0.0005 | 47 |
| | 3.8800 ± 0.0005 | 30 |
| | 2.9850 ± 0.0005 | 26 |
| $NH_4H_2PO_4$ | 5.3243 ± 0.0005 | 100 |
| | 3.0673 ± 0.0005 | 90 |
| | 3.0779 ± 0.0005 | 85 |
| | 3.7507 ± 0.0005 | 55 |
| | 2.0091 ± 0.0005 | 40 |
| $MgSO_4 \cdot 6H_2O$ | 3.4050 ± 0.0005 | 100 |
| | 4.8150 ± 0.0005 | 75 |
| | 3.3510 ± 0.0005 | 70 |
| | 3.3130 ± 0.0005 | 70 |
| $MgSO_4$ | 3.5300 ± 0.0005 | 100 |
| | 3.6100 ± 0.0005 | 70 |
| | 4.1500 ± 0.0005 | 30 |
| $MgHPO_4 \cdot 3H_2O$ | 3.0407 ± 0.0005 | 100 |
| | 3.4616 ± 0.0005 | 66 |
| | 3.0858 ± 0.0005 | 54 |
| | 5.9452 ± 0.0005 | 52 |
| | 4.7141 ± 0.0005 | 47 |
| $CaCl_2 \cdot 6H_2O$ | 3.9380 | 100 |
| | 2.1596 | 93 |
| | 6.8207 | 82 |
| | 3.4211 | 75 |
| | 2.7904 | 74 |
| | 2.5826 | 67 |
| | 2.2736 | 62 |
| | 2.5780 | 46 |
| | 1.7065 | 24 |
| | 1.4884 | 19 |

TABLE 3-continued

| Contamination | d-value (Å) | Rel. intensity (%) |
|---|---|---|
| | 1.9773 | 17 |
| | 1.9689 | 16 |
| | 1.9690 | 16 |
| | 1.4920 | 12 |
| | 1.8991 | 11 |
| | 1.4550 | 10 |
| | 1.5658 | 7 |
| | 1.5658 | 7 |
| | 1.5689 | 6 |
| | 1.7670 | 6 |
| | 1.7106 | 5 |
| | 1.2255 | 5 |
| | 1.1891 | 5 |
| | 1.3930 | 5 |
| $CaCl_2$ | 3.0634 ± 0.0005 | 100 |
| | 4.4780 ± 0.0005 | 85 |
| | 2.3337 ± 0.0005 | 52 |
| | 2.8579 ± 0.0005 | 32 |
| | 1.9091 ± 0.0005 | 29 |
| | 2.2390 ± 0.0005 | 28 |
| | 2.3628 ± 0.0005 | 25 |
| | 2.1000 ± 0.0005 | 21 |
| | 3.4843 ± 0.0005 | 17 |
| | 1.9013 ± 0.0005 | 13 |
| | 1.5317 ± 0.0005 | 12 |
| | 1.8640 ± 0.0005 | 12 |
| | 1.7902 ± 0.0005 | 11 |
| | 1.6923 ± 0.0005 | 8 |
| | 1.2528 ± 0.0005 | 7 |
| | 1.5567 ± 0.0005 | 6 |
| | 1.2080 ± 0.0005 | 6 |
| | 3.1200 ± 0.0005 | 5 |
| | 1.5600 ± 0.0005 | 5 |
| | 1.2506 ± 0.0005 | 5 |

Preferred compositions of the invention indicate a mol ratio of phosphorus to sulfur which is generally in the range 2:1 to 1:5, preferably in the range 1.5:1 to 1:4, and in particular in the range 1:1 to 1:3. The mol ratio of phosphorus to sulfur of the compositions can be determined, for example, through elemental analysis.

Preferred compositions of the invention indicate a mol ratio of phosphorus to magnesium, which is generally in the range 2:1 to 1:5, preferably in the range 1.5:1 to 1:4, and in particular in the range 1:1 to 1:3. The mol ratio of phosphorus to magnesium of the compositions can be determined for example through elemental analysis.

Furthermore, those compositions of the invention are preferred which indicate a water content of 5 to 50 wt. %, in particular 10 to 40 wt. %, and especially of 10 to 30 wt. %, with reference to the total weight of the composition. The water content of the compositions can be determined for example through Karl-Fischer titration.

The invention-related compositions have preferably a phosphorus content, calculated as phosphate, of 10 to 40 wt. %, in particular 15 to 35 wt. %, and especially 15 to 30 wt. %, with reference to the total weight of the composition.

Furthermore, a process for the manufacture of the invention-related compositions has been found, which is characterized in that at least one hydrate of the magnesium sulfate, such as magnesium sulfate, converts with di-ammonium hydrogen phosphate ($(NH_4)_2HPO_4$) together with a further inorganic material, which is selected under zeolite, anhydrous calcium chloride and anhydrous magnesium sulfate and their mixtures.

Preferably, the further inorganic material is used for the manufacture of the invention-related material in such quantities that the weight content of the further inorganic material, in each case with reference to the total amount of hydrate of the magnesium sulfate di-ammonium hydrogen phosphate and further inorganic material in the reaction mixture, is in the range 5 to 50 wt. %, in particular in the range 10 to 30 wt. %.

Preferably, the hydrate of the magnesium sulfate is used in such quantities that the water content, in each case with reference to the total amount of hydrate of the magnesium sulfate di-ammonium hydrogen phosphate and further inorganic material in the reaction mixture, is in the range 5 to 50 wt. %, in particular 10 to 40 wt. %, and especially 10 to 30 wt. %.

Preferably, the hydrate of the magnesium sulfate and $(NH_4)_2HPO_4$ is used in such a quantity ratio so that in the composition obtained after the conversion of phosphorus to sulfur, the mol ratio is generally in the range 2:1 to 1:5, preferably in the range 1.5:1 to 1:4, and in particular in the range 1:1 to 1:3.

In a preferred implementation form of the invention, anhydrous magnesium sulfate is used as a further inorganic substance, i.e. in the invention-related process, the hydrate of the magnesium sulfate, anhydrous magnesium sulfate and $(NH_4)_2HPO_4$ are converted with each other.

In this preferred implementation form of the invention-related process, the hydrate of the magnesium sulfate, anhydrous magnesium sulfate and $(NH_4)_2HPO_4$ is preferably used in such a quantity ratio that, in the composition received after the conversion, the mol ratio of phosphorus to sulfur is generally in the range 2:1 to 1:5, preferably in the range 1.5:1 to 1:4, and in particular in the range 1:1 to 1:3.

In this preferred implementation form of the invention-related process, the hydrate of the magnesium sulfate and anhydrous magnesium sulfate is preferably used in a mol ratio in the range 1:4 to 4:1, preferably 1:3 to 3:1, and especially 1:2.5 to 2:1.

In a further implementation form of the invention, anhydrous calcium chloride is used as a further inorganic substance, i.e. in the invention-related process, the hydrate of the magnesium sulfate, anhydrous calcium chloride and $(NH_4)_2HPO_4$ are converted with each other.

In a further implementation form of the invention, a zeolite is used as a further inorganic substance, i.e. in the invention-related process the hydrate of the magnesium sulfate, at least one zeolite and $(NH_4)_2HPO_4$ are converted with each other. Preferably, the zeolite involves a zeolites dehydrated at least in part, i.e. the zeolite typically includes not more than 50% of the quantity at water that it is able to bind. In particular, a zeolite to a large extent or completely dehydrated is used, i.e. the zeolite typically includes not more than 10% of the quantity at water that it is able to bind. Suitable zeolites are known to the specialist. Both natural and artificial zeolite, in particular those zeolites which are suited as molecular sieves and can bind water. Examples of suitable artificial zeolite are the zeolites of the type zeolite A, zeolite X, zeolite Y, zeolite L, ZSM5 and ZSM11. Examples of suitable natural zeolite are at least in-part dehydrated forms of the faujasites, of the mordenites and the stilbites.

In accordance with a group of preferred implementation forms of the invention-related process, magnesium sulfate is employed as a hydrate of the magnesium sulfate ($MgSO_4 \cdot 7H_2O$).

In particular, for the conversion according to the invention-related process, a mixture composed of a hydrate of the magnesium sulfate, the further inorganic component part, in particular anhydrous magnesium sulfate, and $(NH_4)_2HPO_4$ are added together in the above-designated quantity ratio and mixed well with each other, for example by means of a suitable extruder, by means of a suitable agitator, kneading device or comminution equipment. Preferably, the mixing is implemented by grinding by means of suitable equipment, such as in particular impact or impingement mills, among other things also jaw crushers, rotating crushers, roll crushers, hammer crushers, dog crushers, wormdrive crushers, rolling mills, impact and centrifuging mills.

The conversion according to the invention-related process is exothermic. In this case, it has proved advantageous to implement the conversion of the co-reactants magnesium sulfate hydrate, di-ammonium hydrogen phosphate and the further inorganic component part in the process with utilization of the heat of reaction. Preferably a temperature of 70° C. is not exceeded in this case. Where appropriate, the reaction mixture is therefore cooled. In particular, the conversion is implemented with temperatures in the range 10 to 70° C.

On completion of the reaction, the composition formed is generally allowed to cool down to ambient temperature: In this case, a solid, crystalline, or at least a mainly crystalline mass is obtained, which, at least if the mixing is implemented by grinding, is present in a particular form. Generally, at least 90 wt. % of the particles will then have a diameter which is less than 2 mm, and preferably less than 1 mm. For example, at least 90 wt. % of the particles can indicate a particle diameter in the range 0.01 to 2 mm and especially 0.1 to 1 mm. The particle diameter can be determined by sieve analysis.

The process of the invention enables the manufacture of the invention-related compositions in the above described quality and with the above written specifications. The process furthermore enables the manufacture of invention-related compositions, which contain a compound of Formula I or a mixture of compounds of Formulae I and II and, where appropriate, in addition one or more hydrates of the magnesium sulfate. In particular, with the process Compound I and, where appropriate, Compound II can be manufactured in high yield, generally practically 100%, with reference to the starting materials magnesium sulfate hydrate, $(NH_4)_2HPO_4$ and magnesium sulfate anhydrate.

Preferably the compositions manufactured with the invention-related process include 30 to 100 wt. %, preferably 40 to 80 wt. %, of a compound of Formula I, and a mixture of compounds of Formulae I and II, as well as 0 to 70 wt. %, preferably 20 to 60 wt. %, of a hydrate of the magnesium sulfate, with reference to the total weight of the composition in each case. Furthermore, the compositions of the invention manufactured with the invention-related process have good processing characteristics as indicated above.

The invention further concerns the utilization of the invention-related compositions as flame-retardants in different areas of application. The compositions are particularly suitable as flame-retardants in insulating materials, especially in those which are based on organic fiber materials, such as e.g. cellulose fibers obtained from scrap-paper, wood fiber, as well as sheep's wool.

Correspondingly, the invention also concerns insulation materials on the basis of organic fiber materials which were treated with a composition of the invention acting as flame-retardants. The processing is generally implemented by mixing the fiber materials with an invention-related composition, for example in a rotating barrel mixer or a shredding system.

An invention-related insulating material accessible in this way usually includes a composition of the invention in a quantity of 2 to 25 wt. %, in particular 5 to 20 wt. %, and especially 7 to 15 wt. %, with reference to the weight of the insulating material.

The invention-related composition and the invention-related processes are explained in more detail by the following examples.

GENERAL SPECIFICATION FOR EXAMPLES OF 1 TO 10

For the examples of 1 to 10, magnesium sulfate (technical quality), anhydrous magnesium sulfate and an ammonium phosphate salt are mixed in each case, where it involves $(NH_4)H_2PO_4$, a mixture of $(NH_4)H_2PO_4$ and $(NH_4)HPO_4$ or $(NH_4)_2HPO_4$, in the quantities indicated in Table 4. The mixtures, whose total weight was 50 g in each case, were ground for 60 seconds in an IKA universal mill type M20 (motor power 260 W) at approx. 20,000 rotations per minute. The temperature of the mixture was measured before and directly after the grinding procedure, and is indicated for every example in Table 4. In the same way, the pH values of 5 wt. % diluted suspensions of the compositions obtained in each case after the grinding, are listed in Table 4.

TABLE 4

| Example | Magnesium sulfate [g] | $MgSO_4$[a] [g] | AP salt 1[b] [g] | AP salt 2[b] [g] | AP salt 3[b] [g] | Temperature[c] [° C.] Start | Temperature[c] [° C.] End | pH value[d] |
|---|---|---|---|---|---|---|---|---|
| 1 | 25.00 | 8.33 | 16.67 | | | 22 | 51 | 4.8 (23° C.) |
| 2 | 21.43 | 14.29 | 14.29 | | | 25 | 53 | 4.9 (24° C.) |
| 3 | 18.75 | 18.75 | 12.50 | | | 24 | 62 | 4.8 (25° C.) |
| 4 | 25.00 | 8.33 | | 16.67 | | 24 | 40 | 5.4 (24° C.) |
| 5 | 21.43 | 14.29 | | 14.29 | | 24 | 45 | 5.5 (23° C.) |
| 6 | 18.75 | 18.75 | | 12.50 | | 24 | 55 | 5.6 (23° C.) |
| 7 | 25.00 | 8.33 | | | 16.67 | 25 | 54 | 4.8 (23° C.) |
| 8 | 21.43 | 14.29 | | | 14.29 | 24 | 60 | 4.8 (23° C.) |
| 9 | 18.75 | 18.75 | | | 12.50 | 24 | 62 | 4.8 (23° C.) |
| 10 | 30.00 | 0 | | | 20.00 | 23 | 52 | 4.8 (23° C.) |

[a]Anhydrous magnesium sulfate;
[b]Ammonium phosphate salt 1 (AP salt 1) = ammonium dihydrogen phosphate $((NH_4)H_2PO_4)$; AP salt 2 = mixture of ammonium dihydrogen phosphate and di-ammonium hydrogen phosphate $((NH_4)H_2PO_4/(NH_4)_2HPO_4)$; AP salt 3 = di-ammonium hydrogen phosphate $((NH_4)_2HPO_4)$;
[c]Temperatures of the reaction mixture before and directly after the grinding procedure;
[d]pH values of the 5 wt. % diluted suspension of the composition obtained after the conversion.

Observations

Example 1

The crushing material adhered in large part viscously and plastically to the grinding wall and rotor; no powder had formed; during grinding the mill ran stiff between 40 and 45 seconds.

Example 2

Similar to Example 1, however a little more ductile caking deposits.

Example 3

Similar to Example 2, however even more ductile mass which could scarcely be removed from the grinding chamber.

Example 4

Similar to Example 1, however a little less viscous; during grinding the mill ran stiff between 15 and 20 seconds.

Example 5

Similar to Example 3; the mill ran stiff between 20 and 25 seconds.

Example 6

The crushed material was baked on and could be removed from the mill with difficulty only; the mill ran stiff between 20 and 25 seconds.

Example 7

The crushing material was mainly fine and in powder form. A thin, adhering layer was present on the grinding wall which could not be easily detached; with opening the mill a light dust plume, could be observed; during grinding procedure no performance reduction was audible.

Example 8

Similar to Example 7: The thin layer on the grinding wall did not adhere fixed.

Example 9

Similar to Example 8; only in the upper area of the mill did a thin layer adhere to the grinding wall, which could be easily removed.

Example 10

A larger part of the crushing material adhering in the upper area of the grinding chamber was moist and could be easily detached. A further part adhered as a fixed layer in the lower grinding chamber and was difficult to remove. During grinding procedure, no performance reduction was observed.

Phase Analysis by Means of X-Ray Diffractometry (RDA):

The recording of the X-ray powder diffractograms is implemented with a type D 8 Advane Diffractometer of the Co. Bruker, AXS (298 K, Cu-Kα radiation: λ=1.5413 Å), increment: 0.018385738, step duration: 0.2 seconds, detector: Lynx Eye. The phase analyses of the compositions obtained in Examples 1 to 10 are collated in Table 5. The allocation of the phases in accordance with highest probability was implemented by means of comparison material based on the Powder Diffraction Files (PDF-2, Release 1999, Data Sets 1-49, plus 70-86) of the International Center for Diffraction Data (ICDD). The detection limit was between 0.1 and 5%, according to phase.

TABLE 5

Phase relationships of the manufactured compositions[1]

| | Example | | | | | | | | | |
|---|---|---|---|---|---|---|---|---|---|---|
| | 1 | 2 | 3 | 4 | 5 | 6 | 7 | 8 | 9 | 10 |
| $(NH_4)_2Mg(HPO_4)_2 \cdot 4H_2O$ | | | | | | | ++ | ++ | ++ | ++ |
| $(NH_4)_2Mg(SO_4)_2 \cdot 6H_2O$ | ++ | ++ | ++ | ++ | ++ | ++ | ++ | ++ | ++ | ++ |
| $(NH_4)_2SO_4$ | | | | | | | (++) | (++) | (++) | (++) |
| $MgSO_4 \cdot 6H_2O$ | ++ | ++ | ++ | + | + | + | ++ | ++ | ++ | − |
| $MgSO_4$ | ++ | ++ | ++ | (+) | ++ | ++ | (+) | ++ | ++ | − |
| $MgHPO_4 \cdot 6H_2O$ | | | | | | | | | | |
| $MgHPO_4 \cdot 3H_2O$ | (+) | (+) | (+) | (+) | (+) | (+) | | | | |
| $NH_4H_2PO_4$ | (+) | (+) | (+) | (+) | (+) | (+) | (+) | (+) | (+) | (+) |
| $(NH_4)_2HPO_4$ | | | | | − | (+) | (+) | | | |

[1] ++ Phase clearly present; (++) Phase probably clearly present, due to superpositions, however, no definitive allocation could be carried out; + Phase present as a secondary component part or as a trace; (+) Phase probably present as a secondary component part or as a trace, however, due to superpositions no definitive allocation could be carried out; − Phase not verified or below the detection limit.

As can be seen in Table 4, in case of the products obtained in Examples 4 to 9, it involves invention-related compositions, since in Examples 1 to 3 only $(NH_4)H_2PO_4$, however, no $(NH_4)_2HPO_4$ was employed, and no anhydrous $MgSO_4$, was employed in Example 10. As described above in the "Observations", the compositions of the Examples 7 to 9 have significantly improved processing characteristics compared to all others.

SUMMARY

The existing invention concerns compositions which are available through conversion of a hydrate of the magnesium sulfate with di-ammonium hydrogen phosphate and a further inorganic substance, in particular anhydrous magnesium sulfate. The invention also concerns the manufacture of the compositions' and their utilization as flame-retardants.

The invention claimed is:

1. A composition obtained by a process comprising: converting at least one hydrate of magnesium sulfate with di-ammonium hydrogen phosphate $((NH_4)_2HPO_4)$ and with a further inorganic material selected from the group consisting of zeolite, anhydrous calcium chloride, anhydrous magnesium sulfate, and any mixture thereof.

2. The composition according to claim 1, wherein the further inorganic material is anhydrous magnesium sulfate.

3. The composition according to claim 1, comprising a compound of Formula I $$[(NH_4)_2Mg(HPO_4)2 \cdot mH_2O] \quad (I),$$

or a mixture of the compound of Formula (I) with a compound of Formula II $$[(NH_4)_2Mg(SO4)2 \cdot nH_2O] \quad (II),$$

where m is a number of from 3 to 5 and n is a number of from 5 to 7.

4. The composition according to claim 1, further comprising: a hydrate of magnesium sulfate.

5. The composition according to claim 1, wherein a molar ratio of phosphorus to sulfur is from 1.5:1 to 1:4.

6. The composition according to claim 1, which has a water content of from 10 to 40 wt. %, with reference to a total weight of the composition.

7. The composition according to claim 1, which has a phosphorus content, calculated as phosphate, of from 15 to 30 wt. %, with reference to a total weight of the composition.

8. A process for manufacturing the composition according to claim 1, the process comprising:
converting the at least one hydrate of magnesium sulfate with di-ammonium hydrogen phosphate $((NH_4)_2HPO_4)$ together with the further inorganic material.

9. The process according to claim 8, wherein the further inorganic material is anhydrous magnesium sulfate.

10. The process according to claim 9, wherein the hydrate of magnesium sulfate, anhydrous magnesium sulfate and di-ammonium hydrogen phosphate $((NH_4)_2HPO_4)$ is used in such a quantity that a molar ratio of phosphorus to sulfur is from 1.5:1 to 1:4.

11. The process according to claim 9, wherein a molar ratio of the hydrate of magnesium sulfate and anhydrous magnesium sulfate is from 1:3 to 3:1.

12. The process according to claim 8, wherein a mixture of magnesium sulfate, di-ammonium hydrogen phosphate and the further inorganic material is ground.

13. The process according to claim 8, wherein magnesium sulfate is used as the hydrate of magnesium sulfate.

14. A flame-retardant comprising: the composition according to claim 1.

15. An insulating material on the basis of organic fiber materials, comprising: the composition according to claim 1.

16. The composition according to claim 3, wherein m is 4 and n is 6.

17. The composition according to claim 5, wherein the molar ratio of phosphorus to sulfur is from 1:1 to 1:3.

18. The process according to claim 10, wherein the molar ratio of phosphorus to sulfur is from 1:1 to 1:3.

19. The flame-retardant according to claim 14, which is an insulating material of scrap-paper, wood fiber, or sheep's wool.

20. The insulating material according to claim 15, comprising the composition in a quantity of from 5 to 20 wt. %, with reference to a total weight of the insulating material.

* * * * *